United States Patent [19]

McConnell

[11] Patent Number: 4,909,401

[45] Date of Patent: Mar. 20, 1990

[54] BOTTLE WASHING/STORAGE/ORGANIZING/DISPENSING FIXTURE SYSTEM

[76] Inventor: Thomas E. McConnell, 1568 Calzada Ave., Santa Ynez, Calif. 93460

[21] Appl. No.: 267,076

[22] Filed: Nov. 4, 1988

[51] Int. Cl.[4] .............................................. A47F 7/00
[52] U.S. Cl. ...................................... 211/74; 211/41; 248/312
[58] Field of Search ................. 211/41, 74; 248/311.3, 248/312, 313, 102, 103, 105, 106

[56] References Cited

U.S. PATENT DOCUMENTS

| | | | |
|---|---|---|---|
| 808,824 | 1/1906 | Eice | 248/311.3 X |
| 843,826 | 2/1907 | Kloeppinger | 248/311.3 X |
| 1,292,935 | 1/1919 | Walsh . | |
| 1,496,957 | 6/1924 | Walker . | |
| 2,367,448 | 1/1945 | Thiele | 99/409 |
| 2,586,005 | 2/1952 | Colonna | 220/19 |
| 2,620,588 | 12/1952 | Critser | 43/55 |
| 3,289,854 | 12/1966 | Kauffman | 248/313 X |
| 4,512,489 | 4/1985 | Green et al. | 220/19 |
| 4,589,556 | 5/1986 | Peretz | 248/311.3 X |
| 4,732,291 | 3/1988 | McConnell | 220/19 |

Primary Examiner—Robert W. Gibson, Jr.
Attorney, Agent, or Firm—Stetina and Brunda

[57] ABSTRACT

A bottle washing/storage/organizing/dispensing system is disclosed characterized by use of a fixture specifically suitable for use in an automatic dishwasher adapted to securely hold multiple differing shaped bottles thereon throughout the dishwashing cycle. The fixture is formed having plural flexible jaws each of which function independently to releasably capture the neck portion of a bottle therein. The fixture is formed to be releasably attached to the rack of an automatic dishwasher by one or more anchor fasteners as well as provide a stable base suitable for counter top bottle organizing and/or air-drying applications. The fixture is additionally adapted to be received within a mounting bracket disposable under a cabinet to allow rapid insertion, storage, and independent dispensing of multiple bottles from the fixture.

21 Claims, 2 Drawing Sheets

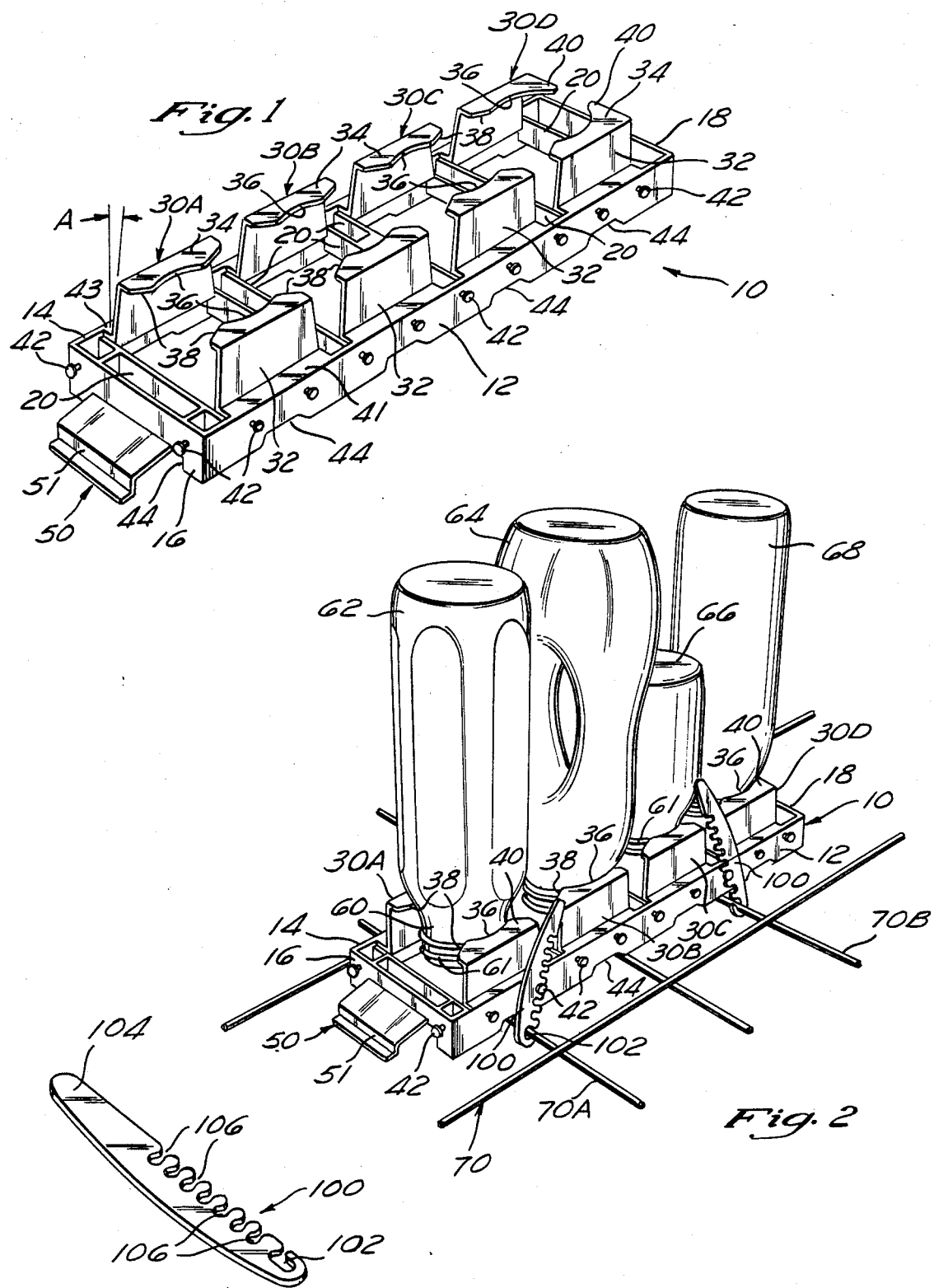

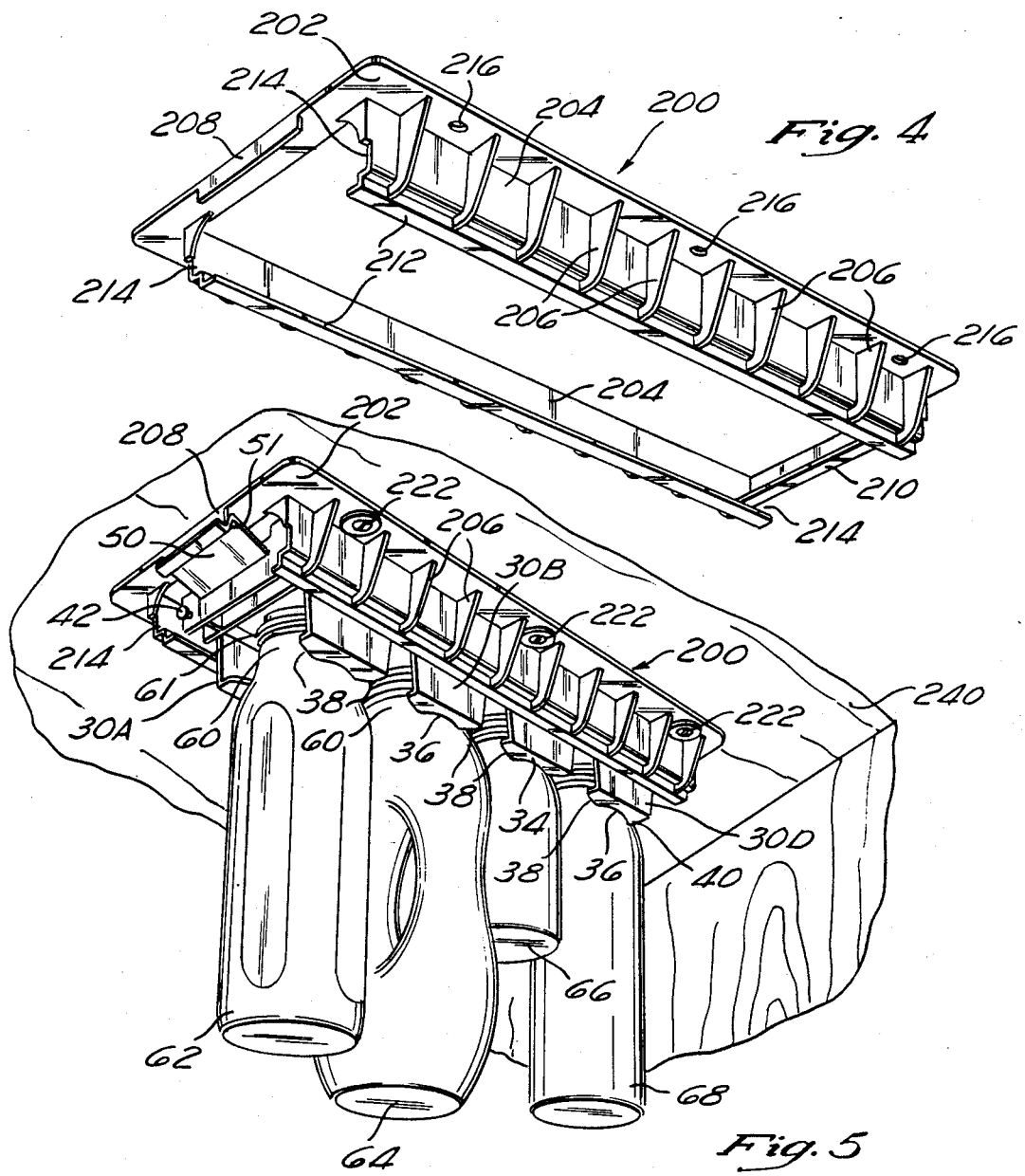

BOTTLE WASHING/STORAGE/ORGANIZING/DISPENSING FIXTURE SYSTEM

BACKGROUND OF THE INVENTION

The present invention relates generally to devices for storing and washing bottles such as baby bottles and more particularly to a bottle washing/storage/organizing/dispensing fixture system suitable for use in an automatic dishwasher adapted to hold multiple differing shaped bottles thereon throughout the dishwashing cycle.

As is well known, conventional automatic dishwashers include a variety of support racks therein designed for holding dishes, plates, utensils, and other kitchen items in an orientation conductive for suitable cleaning and drying during the automatic dishwasher cycle. Although such racks are typically suitable for the vast majority of articles desired to be cleaned therein, they have proven generally inept for holding elongate articles such as glass and/or plastic baby bottles which in order to be properly cleaned and dried within the automatic dishwasher, must be securely maintained in an inverted upright orientation upon the rack throughout the automatic dishwashing cycle. In this regard, due to the substantial water pressure exerted upon such baby bottle articles during the washing cycle, it is all too familiar for such baby bottles to be dislodged from their initial position on the rack and be thrown about during the washing cycle thereby either being improperly cleaned or filling up with water so as to prevent proper drying in the dishwasher. Further, in severe instances, such bottles may be thrown completely off of the rack and settle in the lower drain sump area of the dishwasher adjacent to the heating element of the same, thereby being subject to thermal damage.

Additionally, due to the typical configuration of conventional baby bottles being elongate, they are inherently unstable for storage in either an upright or inverted upright (i.e. upsidedown) orientation. This inherent instability renders such bottles prone to being inadvertently knocked over when disposed upon a counter or within a cabinet thereby posing storage difficulties, as well as in relation to glass bottles additionally posing a significant safety hazard due to inadvertent breakage.

Further, due to the inherent instability of conventional baby bottle configurations, it is often difficult to allow air drying of the same upon a counter or the like when such bottles are hand washed.

As such, there exists a substantial need in the art for a device specifically adapted to securely hold differing shaped bottles within a dishwasher, facilitate, air drying, organization and storage of the same, as well as allow rapid dispensing of bottles when desired.

SUMMARY OF THE PRESENT INVENTION

The present invention specifically addresses and alleviates the above referenced deficiencies associated in the art. More particularly, the present invention comprises a device for washing, storing, organizing, and dispensing elongate articles such as baby bottles for use in both automatic dishwashing and hand dishwashing applications.

The present invention discloses a bottle washing/storage/organizing/dispensing system characterized by use of a fixture specifically suited for use in an automatic dishwasher adapted to securely hold multiple differing shaped bottles thereon throughout the dishwashing cycle.

The fixture is formed having multiple flexible jaws, each of which function independently to releasably capture the open end neck portion of a bottle therein. The jaws of the fixture are preferably fabricated from a flexible plastic material and are formed to exert sufficient pressure on the neck portion of the bottle to securely maintain the bottle in an inverted upright orientation even when encountering the considerable water pressure exerted in automatic dishwashing cycles.

The fixture is specifically formed to be releasably attached to the rack of the dishwasher by one or more anchor fasteners or straps, one end of which may be attached to the dishwasher rack and the other end of which may be releasably attached to plural mounting lugs formed on the side and/or end walls of the fixture. As such, the fixture may be rapidly mounted to all dishwasher racks utilized on conventional automatic dishwashers.

Due to the flexible nature and configuration of the multiple jaws of the fixture, plural bottles can be rapidly inserted onto the fixture at any jaw location or alternatively may be entered adjacent the front of the fixture and laterally transported or slid along the length of the fixture through each successive jaw location.

Additionally, due to the flexible nature and specific configuration of the multiple jaws, the fixture additionally accommodates bottles having differing shapes and sizes as well as accommodates the same when the bottles have their nipple collars and/or end caps mounted thereon. Similarly, the multiple jaws permit each bottle to be removed from the fixture independently either by tripping or canting the bottle angularly and removing the same from the area between adjacent multiple jaws, by actually pulling the bottle perpendicularly from the jaws causing the jaws to deflect outward or by laterally sliding the bottle along the length of the fixture through successive jaws.

Although specifically suited for use in automatic dishwashing applications, the fixture of the present invention additionally provides a stable base platform which organizes and stores multiple bottles thereon upon a counter top or cabinet. Additionally, the fixture is preferably provided with multiple air vents specifically adapted to promote air flow to the interior of the bottle for air-drying applications.

The present invention additionally incorporates a mounting bracket which may be disposed under a cabinet or other support surface which is sized to slidingly receive the fixture therein. With multiple bottles disposed upon the fixture and the fixture maintained within the mounting bracket, the bottles depend downwardly therefrom and may be rapidly dispensed or removed while the fixture is maintained within the mounting bracket. Additionally, with the fixture disposed in the mounting bracket, bottles may be rapidly inserted into the fixture as desired.

In the preferred embodiment, the bottle washing/storage/organizing/dispensing fixture system of the present invention may be fabricated from thermoplastic materials such as polypropylene which are conductive to low cost injection molding fabrication techniques.

DESCRIPTION OF THE DRAWINGS

These as well as other features of the present invention will become more apparent upon reference to the drawings wherein:

FIG. 1 is a perspective view of the bottle holding fixture of the present invention;

FIG. 2 is a perspective view of the bottle holding fixture of the present invention secured to the rack of a conventional automatic dishwasher and having multiple bottles retained thereon;

FIG. 3 is a perspective view of the anchor fastener or strap utilized to retain the bottle holding fixture of the present invention upon an automatic dishwasher rack;

FIG. 4 is a perspective view of the mounting bracket of the present invention; and FIG. 5 is a perspective view of the bottle holding fixture having multiple bottles retained thereon disposed within the mounting bracket of FIG. 4.

DETAILED DESCRIPTION OF THE PREFERRED EMBODIMENT

Referring to the Figures, there is shown the bottle washing/storage/organizing/dispensing fixture system of the present invention composed generally of a fixture 10, anchor fastener 100 and mounting bracket 200 which are preferably formed from a thermoplastic material such as polypropylene suitable to withstand operating temperatures and detergent/chemicals utilized in conventional automatic dishwashers. As best shown in FIG. 1, the fixture 10 is composed as an elongate member having a pair of side walls 12 and 14, a front end wall 16 and rear end wall 18. The side walls 12 and 14 are interconnected by way of one or more cross ribs or struts 20 which are preferably integrally formed with the side walls 12 and 14 to maintain a parallel coplanar orientation for the side walls 12 and 14.

The fixture 10 is provided with one or more pairs of opposing jaws 30A, 30B, 30C and 30D which are spaced along the length thereof and are preferably integrally formed with the side walls 12 and 14. Each of the jaws 30 is formed having an upwardly extending side wall portion 32 and generally horizontally extending top portion 34. In the preferred embodiment, the side wall portions 32 of the jaws 30 extend upwardly from the side walls 12 and 14 at an inward angle of inclination A (shown in FIG. 1) of approximately 5 to 7 degrees while the top portion 34 of each jaw 30 is formed having a central annular recess 36 preferably sized having a radius of approximately 0.675 through 0.700 inches. Opposite ends of the horizontal top portion 34 of each of the jaws 30 is additionally provided with an angularly extending camming surface of edge 38 which as will be explained in more detail infra, serves to facilitate rapid entry and removal of multiple bottles from the fixture 10. In the preferred embodiment, the last pair of jaws 30D includes the camming surface 38 only on its leading end while the distal end includes an inward extension 40 which as will be explained in more detail infra serves to prevent any bottles from being slid outwardly beyond the rear end wall 18 of the fixture 10.

The side walls 12 and 14 and/or end walls 16 and 18 of the fixture 10 are preferably provided with plural mounting lugs 42 which extend laterally outward therefrom. As shown the mounting lugs 42 include a cylindrical shaft portion and an enlarged head portion and additionally are preferably formed integral with the side walls and end walls 12, 14, 16 and 18. The side walls and end walls 12, 14, 16, and 18 additionally include plural notches 44 formed adjacent their lower surface which are preferably disposed axially beneath each of the jaws 30. As such, when the fixture 10 is disposed upon a support surface in the orientation depicted in FIG. 1, the notches 44 define air vents allowing air to travel beneath the side walls and end wall 12, 14, 16 and 18 and within the interior region defined between the opposing jaw pairs, 30A, 30B, 30C and 30D. The front end wall 16 additionally is provided with an outwardly extending tab or latch 50 serves as a releasable clasp or fastener to retain the fixture 10 within the mounting bracket 200.

As best depicted in FIG. 2, the opposing pair of jaws 30A, 30B, 30C and 30D are specifically adapted to capture the open end or neck portion 60 of differing sized bottles 62, 64, 66, and 68 and maintain the bottles in an inverted upright orientation. This desired result is achieved by the interaction of the specific shape of the annular recesses 36 formed in the jaws 30, the flexible resilient property of the thermoplastic material utilized for the jaws 30 as well as the vertical extension and angular inclination of the side wall portions 32 of each jaw 30. More particularly, the side wall portions 32 of each of the jaws 30 is preferably formed to have a vertical height slightly greater than the vertical height of the neck portion 60 of the bottles 62, 64, 66, and 68 such that the neck portion 60 either with or without having their conventional bottle collar or cap rings (not shown) disposed thereon, may be disposed between the lower surface of the horizontal portion 34 of the jaws 30 and the upper surface of the struts 20 extending between the side walls 12 and end walls 12 and 14. Additionally, the spacing between the annular recesses 36 is preferably formed to have a distance equal to or slightly less than the diameter of the neck portion 60 of the smallest conventional baby bottle 62 through 68 so as to frictionally engage the same. As will be recognized, due to the inward angular inclination of the side wall portions 32 of each of the jaw 30 as well as the resilient flexible nature of the thermoplastic material of the fixture 10, larger diameter neck portions 60 may be accommodated between the jaw pairs 30 by outboard flexing of the side wall portions 32 of each of the jaws 30.

With the structure defined, the manner in which multiple bottles 62, 64, 66 and 68 may be inserted and/or removed from the fixture 10 may be described with specific reference to FIG. 2. Initially, a first bottle 68 may be disposed in an inverted upright orientation adjacent the front end wall 16 of the fixture 10 and its neck portion 60 may be registered between the opposing jaw pair 30A. Subsequently, the bottle 68 may be horizontally slid relative to the fixture 10 from the front end wall 16 toward the rear end wall 18 whereby the neck portion 60 of the bottle 68 contacts the camming surfaces 38 formed on the jaw pair 30A. Upon continued lateral sliding movement, the neck portion 60 cams against the camming surfaces 38 whereby due to the construction and flexible properties of the thermoplastic material of the jaws 30A, the side wall portions 32 of the jaw pair 30A deflect outwardly, allowing the neck portion 60 to travel into the annular recesses 36 formed in the top portions 34 of the opposing jaw pair 30A. Due to the internal memory and resilient property of the jaw pair 30A as well as the angular inclination of the side wall portions 32 of the jaw pair 30A, the jaw pair 30A is biased inwardly and immediately returns toward its initial orientation whereby a strong frictional engagement is maintained between the neck portion 60 of bottle 68 and the annular recesses 36 formed on the jaw pair of 30A. This frictional engagement is of a magnitude sufficient to maintain the bottle 68 between the jaw pair 30A throughout an automatic dishwashing cycle.

If desired, the bottle 68 may be further laterally slid along the length of the fixture 10 from the front end wall 16 toward the rear end wall 18, whereby the bottle 68 sequentially interacts with the remaining plural opposed jaw pairs 30B, 30C and 30D in a manner previously described in relation to jaw pair 30A. Upon entry in to the last jaw pair 30D, it will be recognized that the extensions 40 (shown in FIG. 1) prevent the bottle 68 from being laterally slid out of engagement with the jaw pair 30D and thereby be retained upon the fixture 10.

Subsequently, additional bottles 66, 64 and 62 may be inserted onto the fixture 10 in a similar manner as depicted in FIG. 2. It is an important feature of the present invention that due to each bottle 62, 64, 66 and 68 being retained within a respective opposed jaw pair 30A, 30B, 30C and 30D, the fixture 10 can simultaneously hold or capture bottles of differing size to thereby accommodate differing applications of the user.

Additionally, it will be recognized that the bottles 62, 64, 66 and 68 may be entered at any position between the plural jaw pairs 30A, 30B, 30C and 30D by aligning the bottle neck portion 60 of a respective bottle 62, 64, 66 and 68 and canting the bottle 62, 64, 66 and 68 toward a horizontal plane to allow the neck portion 60 to be entered into a desired jaw pair 30A, 30B, 30C, and 30D and contact respective camming surfaces 38, formed on the jaw pairs 30A, 30B, 30C or 30D. Subsequently, the bottle may be slid laterally against the desired jaw pair 30A, 30B, 30C or 30D causing the jaw pairs 30A, 30B, 30C and 30D to flex outwardly in a manner previously described. Upon full entry between the jaw pair 30A, 30B, 30C, or 30D the bottles 62, 64, 66 or 68 may be returned to its fully upright (noncanted) position.

In a similar manner, it will be recognized that the individual bottles 62, 64, 66 and 68 may be removed from the fixture 10 by lateral sliding movement toward the front end wall 16 of the fixture 10 or by angularly canting the same in a horizontal plane and laterally sliding the bottle neck 60 out of engagement with its respective jaw pair 30A, 30B, 30C or 30D. Finally, the bottles 62, 64, 66 and 68 may further be removed from the fixture 10 merely by pulling the bottles 62, 64, 66 and 68 axially upward in a direction perpendicular to the fixture 10 whereby the threaded portion 61 of each of the bottles 62, 64, 66 and 68 contacts the lower surface of the horizontal portion 34 of each of the jaw pairs 30A, 30B, 30C and 30D causing the jaw pairs 38 to flex outwardly to release the bottle 62, 64, 66 and 68 from the fixture 10.

From the above description, it will recognized that the fixture 10 facilitates multiple applicational use. For instance, in applications wherein the bottles 62, 64, 66 and 68 are hand washed, the washed bottles 62, 64, 66 and 68 may be inserted into the fixture as depicted in FIG. 2 to maintain the same in an inverted upright orientation. The fixture 10 having the bottles 62, 64, 66 and 68 thereon may then be placed on a counter for air-drying of the bottles 62, 64, 66 and 68. In such air-drying applications, the notches 44 formed on the lower portions of the end and side walls 12, 14, 16 and 18 of the fixture 10 serve as air vents allowing air to enter within the interior of each of the bottles 62, 64, 66 and 68 thus promote rapid drying thereof. Additionally, with the bottles 62, 64, 66 and 68 disposed within the fixture 10, the fixture 10 provides a stable support platform or base whereby the bottles 62, 64, 66 and 68 may be stored on a counter or within a cabinet for later use. Thus, the fixture 10 provides an organizing and storing function for multiple bottles.

Alternatively, for automatic dishwashing applications, the fixture 10 having the multiple bottles 62, 64, 66 and 68 disposed thereon may be placed on a conventional dishwasher rack 70 as shown in FIG. 2 to maintain the bottles 62, 64, 66 and 68 in an inverted upright orientation throughout the automatic dishwashing cycle. In those instances where the plural bottles 62, 64, 66 and 68 are formed of a light weight plastic material whereby the weight of the fixture 10 and bottles 62, 64, 66 and 68 thereon may be insufficient to withstand water pressure exerted during the automatic dishwashing cycle, the fixture 10 may be firmly held against the dishwasher rack 70 by way of the use of the plural anchor fasteners 100 depicted in FIG. 3. Preferrably, the anchor fastener 100 comprises an elongate strap member formed of a flexible thermoplastic material. The strap 100 includes an elongate aperture 102 adjacent one end thereof and a handle portion 104 at the opposite end thereof. One or more edges of the strap 100 is provided with a series of teardrop shaped apertures 106 extending axially along the length of the strap 100.

As depicted in FIG. 2, the anchor or strap 100 may be affixed to the automatic dishwashing rack 70 by insertion of one of the rack wire segments 70A or 70B into the elongate aperture 102 formed adjacent the end of the strap 100. Subsequently, the strap 100 may be rotated upon the rack element 70A or 70B whereby a respective one of the teardrop apertures 106 formed in the strap 100 aligns with one of the plural mounting lugs 42 formed on the side walls and end walls 12, 14, 16 and 18 of the fixture 10. The cylindrical shank portion of the lug 42 may then be inserted within the interior of the teardrop aperture 106 to frictionally engage the same. As will be recognized, one or more of the strap members may be utilized to releasably affix the fixture 10 upon the dishwasher rack 70 to maintain its position thereupon the automatic dishwashing cycle. When it is desired to remove the fixture 10 from the rack 70, the handle portion 104 of the strap 100 may be grasped to rotate the strap 100 out of engagement with its respective lug 42. Subsequently the entire fixture 10 having the multiple bottles 62, 64, 66 and 68 disposed thereon may be removed from the dishwasher rack 70. With the fixture 10 removed from the rack 70, the plural straps 100 may be retained upon the rack 70 for subsequent reuse or alternatively removed from the rack 70 as desired.

Referring to FIG. 4, in the preferred embodiment, the bottle washing/storage/organizing/dispensing fixture system of the present invention includes a mounting bracket 200 which is formed in an elongate configuration having a base portion 202 and pair of side walls 204 which depend downwardly from the base plate 202. In the preferred embodiment the mounting bracket 200 is additionally formed of a thermoplastic material conducive of fabrication by conventional injection molding techniques. To provide sufficient rigidity for the bracket 200, plural support struts 206 are provided along the length of the bracket 200 extending between the base plate 202 and side walls 204. The front end of the base plate 202 is provided with a raised flange shoulder or latching plate 208 while the rear end of the base plate 202 is provided with an abutment wall 210 which preferrably extends between the pair of side walls 204. The distal end of each of the pair of side walls 204 is provided with an inwardly extending flange or rail 212 which preferrably extends throughout the length thereof. The horizontal spacing between the rails 212 is sized to be greater than the width of the jaw pairs 30A, 30B, 30C and 30D yet less than the width across the side walls 12 and 14 of the fixture 10. Additionally, each of the side walls 204 is provided with an elongate recess 214 the lateral spacing of which is sized to be slightly greater than the distance across the exterior of the mounting lugs 42 formed on the fixture 10. The base plate 202 further includes plural mounting apertures 216 positioned along its length.

Referring to FIG. 5, the mounting brackets 200 may be mounted to the undersurface 240 of a cabinet or support surface by way of plural threaded fasteners 222 extending through the apertures 216 and into the cabinet undersurface 240. Subsequently, the fixture 10 with one or more of the plural bottles 62, 64, 66 and 68 disposed thereon in a manner previously described may be inverted from its orientation shown in FIGS. 1 and 2 with the rear end wall 18 of the fixture 10 being aligned with the front end of the fixture 200. The fixture 10 may then be inserted within the front end of mounting bracket 200 by sliding the top surface 41 and 43 of the side walls 12 and 14 respectively (shown in FIGS. 1 and 2) along the top surface of the rails 212 of the mounting bracket 200. As will be recognized, during this sliding movement, the opposed jaw pairs 30A, 30B, 30C and 30D extend downwardly between the rails 212 while the plural lugs 42 formed on the side walls 12 and 14 of the fixture 10 are disposed within the elongate recesses 214 formed on the side walls 212 of the bracket 200. The fixture 10 may be laterally inserted or slid along the length of the rails 212 until the end wall 18 of the fixture 10 contacts the rear abutment wall 210 formed on the fixture 200.

Prior to abutment of the rear wall 18 of the fixture 10 with the rear abutment wall 210 of the fixture 200, the latch 50 formed on the front end of the fixture 10 contacts the flange 208 formed on the front end of the fixture 200. Due to the flexible nature of the thermoplastic material of which the fixture 10 is formed, continued sliding movement of the fixture 10 relative the mounting bracket 200 causes the latch 50 to moderately deflect downward and slide upon the upper edge of the flange 208. As the rear end wall 18 of the fixture 10 approaches the rear abutment wall 210 of the mounting bracket 200, the ledge portion 51 of the latch 50 passes beneath the flange 208 allowing the latch 50 to return to its normal orientation wherein the ledge portion 51 of the latch 50 contacts the inside surface of the flange 208 as depicted in FIG. 5. When disposed in this position, the latch 50 maintains the fixture 10 within the mounting bracket 200 and prevents the fixture 10 from being inadvertently slid outwardly from the mounting bracket 200. With the fixture 10 maintained within the mounting bracket 200, a user may remove or dispense one or more of the plural bottles 62, 64, 66 and 68 therefrom in a manner previously described or alternatively insert one or more of the multiple bottles 62, 64, 66 and 68 within the fixture in a manner previously described for use and storage respectively. When it is desired to remove the fixture 10 from the mounting bracket 200, a user may manually depress the latch 50 whereby the ledge portion 51 of the latch 50 is momentarily disposed at an elevation below the top edge of the flange 208 and the fixture 10 may then be manually slid outwardly from the front end of the mounting bracket 200.

From the above, it will be recognized that the present invention comprises a significant improvement in the art by providing a bottle washing/storage/organizing/dispensing fixture system which although specifically suited for use in conventional automatic dishwashers, additionally has utility for manual washing and drying applications. Further, it will be recognized that the system of the present invention readily accommodates bottles of differing sizes and configurations as well as the selective dispensing of the same from the fixture.

Although for purposes of description, certain material sizes, orientations and configurations have been defined herein, those skilled in the art will recognize that various modifications to the same may be incorporated without departing from the spirit of the present invention and such modifications are clearly contemplated herein.

What is claimed is:

1. A device for holding and facilitating the washing of bottles, said device comprising:
   an elongate fixture; and
   plural jaw means extending from said fixture for releasably capturing the neck portion of at least one bottle to maintain said bottle in an inverted upright orientation upon said fixture;
   said plural jaw means comprising a plurality of opposed jaw pairs spaced along the length of said fixture.

2. The device of claim 1 wherein said plurality of opposed jaw pairs are each formed to independently capture said neck portion of a respective bottle.

3. The device of claim 2 wherein said plurality of opposed jaw pairs are each formed of a resilient flexible material sufficient to accommodate differing sized neck portions of bottles.

4. The device of claim 3 wherein each of said plurality of opposed jaw pairs are formed having a side wall portion extending angularly upward from said fixture and a generally horizontal portion extending inwardly over said fixture.

5. The device of claim 4 wherein said generally horizontal portion of said opposed jaw pairs includes a central annular recess sized to frictionally engage the neck portion of said bottle.

6. The device of claim 5 wherein said generally horizontal portion of said opposed jaw pairs includes a camming surface adjacent said central annular recess adopted to urge said opposed jaw pairs outwardly from one another to facilitate entry and removal of a bottle from each of said opposed jaw pairs.

7. The device of claim 6 wherein said fixture is formed having a pair of side walls and a front end wall and a rear end wall.

8. The device of claim 7 further comprising plural notches formed in said side walls for promoting air flow within the interior of said fixture.

9. The device of claim 8 further comprising means for releasably mounting said fixture upon a rack of an automatic dishwasher.

10. The device of claim 9 wherein said releasably mounting means comprises at least one strap member having means for capturing a portion of said dishwasher rack and means for engaging said fixture.

11. The device of claim 10 wherein said means for engaging said fixture comprises plural apertures formed along the length of said strap member sized to receive a lug extending outwardly along said pair of side walls of said fixture.

12. The device of claim 7 further comprising a mounting bracket adapted to be affixed to a support surface, said mounting bracket sized to slidably receive said fixture therein and support said fixture upon said support surface.

13. The device of claim 12 wherein said fixture includes a latch adjacent said front end wall which engages a flange formed on said mounting bracket to releasably lock said fixture to said mounting bracket.

14. A system for washing, storing and dispensing multiple bottles comprising:
- a fixture defining a base portion and plural jaw means extending from said base portion for releasably capturing the neck portion of multiple bottles to maintain the multiple bottles in an inverted upright orientation upon said fixture; and
- a bracket adapted to be affixed to a support surface to releasably mount said fixture to said support.

15. The system of claim 14 wherein said bracket is sized to slidably receive said base portion of said fixture therein.

16. the system of claim 15 further comprising latch means formed on said fixture for releasably engaging said bracket.

17. The system of claim 14 further comprising means for releasably mounting said fixture upon a rack of an automatic dishwasher.

18. The system of claim 17 wherein said releasably mounting means comprises a strap extensible between said fixture and said rack of said automatic dishwasher.

19. The device of claim 14 wherein said fixture is formed of a resilient thermoplastic material.

20. A device positionable on a standard dishwasher rack and operative to hold at least one bottle in substantially fixed position relative to said dishwasher rack, said device comprising:
- a fixture formed separately from and releasably attachable to said dishwasher rack;
- a plurality of jaw members extending from said fixture for releasably grasping and holding at least one bottle in an inverted upright orientation on said fixture.

21. The device of claim 20 wherein said fixture is releasably attachable to said dishwasher rack by way of at least one plastic strap member concomitantly attachable to said fixture and to said dishwasher rack so as to hold said fixture in a fixed position on top of said rack.

* * * * *